United States Patent [19]

Atwood

[11] Patent Number: 5,540,578
[45] Date of Patent: Jul. 30, 1996

[54] BAGEL STICK FORMING DEVICE

[75] Inventor: Thomas A. Atwood, Dolton, Ill.

[73] Assignee: AM Manufacturing Company, Dolton, Ill.

[21] Appl. No.: 257,092

[22] Filed: Jun. 7, 1994

[51] Int. Cl.[6] .................................................. A21C 11/00
[52] U.S. Cl. ................................ 425/364 B; 425/364 R; 425/393; 425/403
[58] Field of Search ........................... 425/364 B, 364 R, 425/393, 403, 308; 426/499, 512, 514

[56] References Cited

U.S. PATENT DOCUMENTS

| | | | |
|---|---|---|---|
| 3,143,084 | 8/1964 | Rhodes | 425/364 B |
| 3,407,754 | 10/1968 | Wichinsky | 425/374 |
| 3,491,704 | 1/1970 | Thompson | 425/364 B |
| 3,857,663 | 12/1974 | Atwood | 425/308 |
| 3,862,818 | 1/1975 | Atwood | 425/308 |
| 4,076,480 | 2/1978 | Marano | 425/364 B |

*Primary Examiner*—Robert Warden
*Assistant Examiner*—Hien Tran
*Attorney, Agent, or Firm*—Hill, Steadman & Simpson, A Professional Corporation

[57] ABSTRACT

A modification is provided to a traditional dough-forming machine for producing bagels so that the machine can produce an elongated bagel stick. The machine has a flat conveyor belt onto which incremental pieces of dough are dropped. The belt is pulled through a forming tube which curls and rolls the dough increments around an axially positioned mandrel. The mandrel has an elongated fin which extends at least to or through a wall of the forming tube and which prevents free ends of the dough from pressing against each other to form a continuous circular shape around the mandrel.

14 Claims, 3 Drawing Sheets

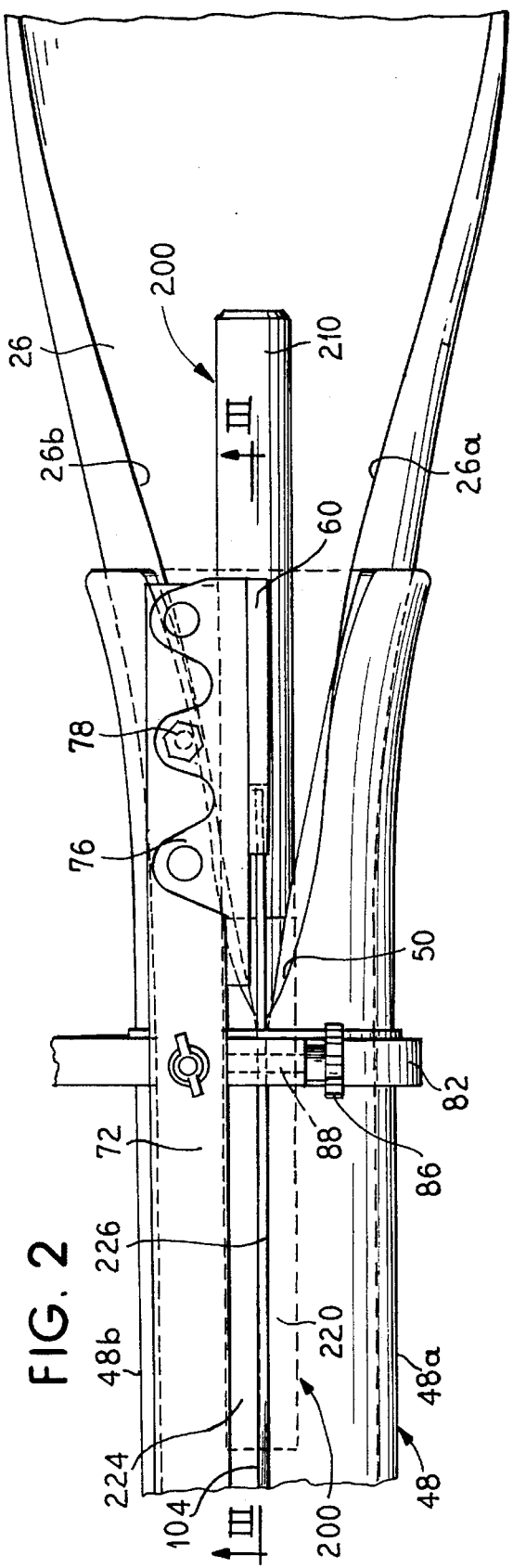
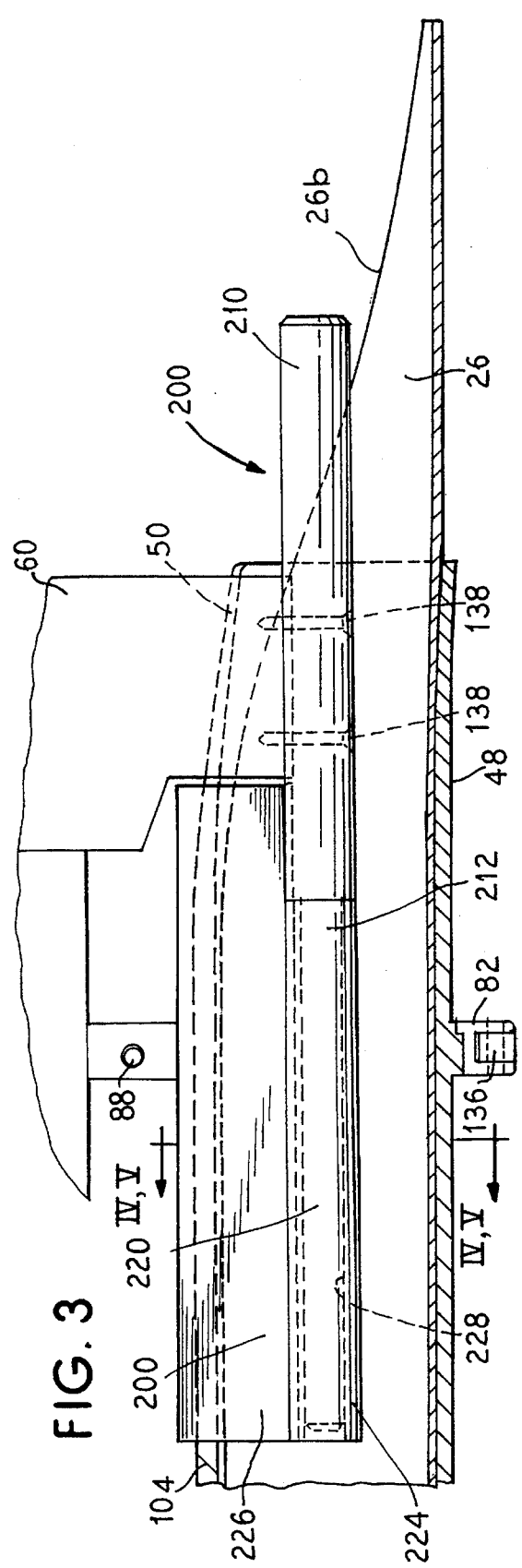

BAGEL STICK FORMING DEVICE

BACKGROUND OF THE INVENTION

This invention relates to a dough forming machine, and in particular to a bagel forming machine which forms elongated rolls known as bagel sticks. The invention provides a modification to known machines for producing circular rolls, such as bagels, so that the rolls produced are not circular, but in a stick form.

Machines for forming bagels are known. In a traditional such machine, a motor driven circulating looped belt is provided with a horizontal top surface. The belt is wrapped around an idler drum and a drive drum. At a first end of the machine, a pressure plate having a downward arcuate surface toward the belt is provided slightly elevated from the top surface of the belt. A dough guide plate is provided upstream of the pressure plate. When an incremental amount of dough is placed onto the belt, the belt carries the dough beneath the pressure plate which causes the incremental amount to roll and elongate into a solid cylinder shape. At approximately the mid-span of the top surface of the belt is arranged a forming tube having an inside diameter approximating the outside diameter of the desired bagel shapes. The forming tube has a V-shaped cut-out at a top side thereof. A mandrel with an outside diameter approximating the diameter of the central hole of the bagel is mounted axially through the forming tube.

The lateral edges of the belt are wrapped upward into a circular shape corresponding to the inside diameter of the forming tube, guided into the forming tube by the V-shaped notch. The belt passes through the forming tube while in the circular shape and once it exits the forming tube, the belt flattens back down into a flat horizontal profile. Before returning to the first end of the assembly, the belt extends above a rotary table for receiving the finished product which drops off the belt. The rotary table could also be a further belt or other product receiving station.

The forming tube typically comprises two half circular sections with a seam located on a top side of the tube. The tube also provides a V-shaped notch at the top at the upstream axial end thereof. The V-shaped notch guides the lateral edges into the circular shape to pass into the forming tube. It is known to fixedly fasten an arcuate shield piece to partially cover a central area of the V-shaped notch and to guide excess dough into the circle formed by the belt wrapped into the tube.

The incremental amount of dough is pulled by the belt through the forming tube, where the elongated piece of dough wraps around the mandrel. The dough rolls between the belt and the mandrel into a uniform annular bagel shape with the portions of the dough piece which had been the free ends being pressed against one another so as to form a seamless circle.

Another type of roll known as the bagel stick is formed of the same dough. A bagel stick is not shaped in a continuous circle, however. A bagel stick is elongated and generally straight. It is known to modify a traditional bagel forming machine so that it can also be used to produce bagel sticks or smaller pieces of dough.

The known modification provides an elongated fin secured to the mandrel. The fin extends radially from the mandrel toward an inner wall of the forming tube. Such a prior art embodiment is illustrated in FIG. 5. The fin 226a does not extend completely to the forming tube 48, but is separated therefrom by a gap. Edges of the belt 26 can touch or overlap within this gap.

Other examples of prior art include U.S. Pat. Nos. 3,357,663 and 3,862,818 relating to finned dough mandrels for severing a dog piece in one or more places.

The mandrel in a traditional bagel forming machine is desirably vertically adjustable. This adjustment is provided so that a non-uniformity or lopsidedness in the bagels or bagel sticks can be corrected. In a traditional bagel stick forming configuration, axial adjustment of the mandrel can cause a widening of the gap between the fin and the forming tube.

The gap is undesirable, as it collects dough or leave an undesirable indentation on a bagel stick. Accumulations of dough in the gap can result in misshapen bagel sticks or undesirable globules of dough which can stick to the belt or other parts of the machine. Such undesirable accumulations worsen as the gap is widened.

It is known to minimize the gap by extending a fin from the mandrel to the belt. Such a configuration is shown in U.S. Pat. No. 3,862,818. However, this configuration results in impeded adjustability of the mandrel within the forming tube.

Therefore, it is desirable to provide an improved bagel stick forming device which can be used to modify a traditional bagel forming machine. Furthermore, it is desirable to provide a bagel stick forming device which overcomes problems associated with a gap between the fin and the forming tube. Moreover, it is desirable to provide a bagel stick forming device which allows vertical adjustment of a mandrel without causing unwanted dough accumulations.

SUMMARY OF THE INVENTION

It is an object of the present invention to provide a mandrel which can be installed on a known bagel forming machine which modifies the machine so that it produces rolls in the shape of an elongated stick. To this end, in an embodiment, an improvement is provided to a dough roll forming machine having a flat circulating belt. The belt has a region wrapped into a circular cross section and threaded through a forming tube. The improvement is an elongated mandrel which has a removable cylindrical section held axially through the forming tube. The mandrel has an elongated fin extending radially from the cylindrical section substantially along its length so that the fin extends to the forming tube.

In an embodiment, the cylindrical section has an axial hollow cavity shaped to receive a mounting rod.

In an embodiment, the mandrel is adjustable radially.

In an embodiment, the fin is longer than the removable cylindrical section.

In an embodiment, an improvement is provided to a machine for forming rolled dough pieces. The machine has a flat belt circulating around two pulleys. The flat belt has a horizontal orientation on a top side thereof. The flat belt is wrapped and drawn through a circular forming tube along a portion of the top side. The improvement is a mandrel axially aligned and radially adjustable within the tube. The mandrel has an elongated section and a radial fin extending therefrom substantially along the length of elongated section so that the fin extends through a wall of the forming tube.

In an embodiment, a bagel stick forming machine is provided having a drive wheel driven by a motor. An idler wheel is also provided. A belt extends between the drive wheel and the idler wheel. A forming tube is positioned between the drive wheel and the idler wheel through which the belt passes. The forming tube causes lateral edges of the belt to curl upwardly forming a substantially circular cross section for the belt. An elongated mandrel is axially aligned and radially adjustable within the forming tube. The mandrel has an elongated cylindrical section and an elongated fin extending radially therefrom through a seam in the forming tube.

Additional features and advantages of the present invention are described in, and will be apparent from, the detailed description of the presently preferred embodiments and from the drawings.

BRIEF DESCRIPTION OF THE DRAWINGS

FIG. 2 is a partial top plan view of the apparatus of FIG. 1.

FIG. 3 is a sectional side view taken generally along III—III from FIG. 2.

DETAILED DESCRIPTION OF THE PREFERRED EMBODIMENTS

Figure 1:
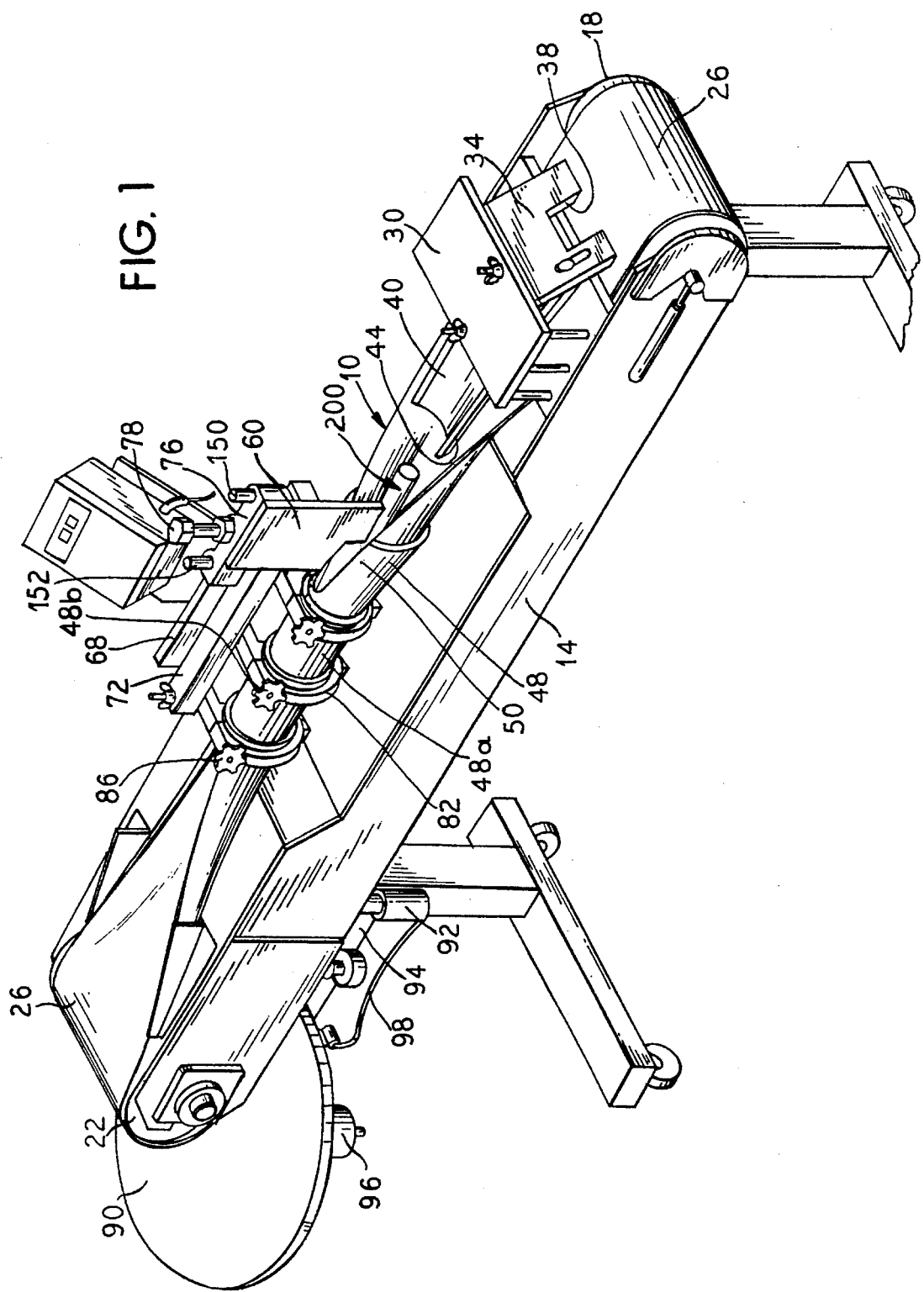
FIG. 1 is a perspective view of the apparatus of the present invention.

In accordance with the invention described, with reference to the accompanying figures, wherein like numerals designate like parts, a dough forming machine 10 is provided as illustrated in FIG. 1. The dough forming machine 10 has a frame 14 rotatively holding a drive drum 22 at one end thereof and an idler drum 18 at an opposite end thereof. Wrapped around the drive drum 22 and the idler drum 18 is a continuous belt 26. The drive drum 22 is driven by a motor (not shown). At a first end adjacent to the idler drum 18 is a dough guide bracket 30 which mounts a dough guide 34 having a window 38 for receiving incremental amounts of dough. Dough placed in the window 38 is drawn by the belt 26 under a pressure plate 40 having an arcuate bottom surface 44.

Central along a length of the belt 26 is a forming tube 48. The belt 26 is wrapped into an approximate circular shape by being drawn through the forming tube 48. The forming tube 48 comprises left and right semicircular sections 48a, 48b split at a top and bottom of the forming tube 48. The forming tube 48 provides a V-shaped notch 50 at a top side thereof facing the pressure plate 40. Located generally axially and concentrically within the forming tube 48 is a mandrel 200. The mandrel 200 is supported by a mandrel support 60 which protrudes upwardly through the V notch 50.

The sections 48a, 48b of the forming tube 48 are supported by an assembly mount plate 68. Connected to the mount plate 68 is a mandrel mount bar 72 which is adjustably connected to a mandrel adjusting block 76. The adjusting block 76 holds a vertical adjusting screw 78 for vertically raising and lowering the adjusting block 76 with respect to the mount bar 72. Posts 150 and 152 assume alignment of the adjusting block 76. The adjusting block 76 is connected to, or integral with, the mandrel support 60 hence the mandrel 200 can be adjusted radially or vertically as shown, with respect to the forming tube 48. The forming tube is held with respect to the assembly mount plate by three split and hinged forming tube clamps 82 operable by rotating star knobs 86 which are threaded onto connecting studs 88 shown in FIG. 2.

At a discharge end of the belt 26, mounted below the belt, is a rotary table or carousel 90 for receiving the formed circular dough shapes for further processing, such as packing or baking. The carousel 90 is mounted via a swivel mount 92 and a swing arm 94 proceeding from the swivel mount 92. A motor 96 drives the carousel and is fed via a power cord 98. A different receiving station could be utilized such as an additional belt or box or other such means for receiving the formed dough.

FIG. 2 shows the forming tube 48 comprising the left section 48a and the right section 48b having a top connection interface or seam 104. The belt 26 is shown with edges 26a, 26b being wrapped into close proximity within the tube 48 forming a generally circular cross section.

FIG. 3 illustrates the stud 88 which closes the clamp 82, and also shows a bottom pinned connection 136 for providing the hinge for opening the clamp 82. Also, FIG. 3 illustrates the detail of the mandrel 200. The mandrel 200 comprises a multipiece assembly including a first mandrel section 210 and a second mandrel section 220. The first mandrel section 210 is secured to the mandrel support 60 by screws 138. The first mandrel section 210 has an extending mounting rod 212 for mounting the second mandrel section 220.

The second mandrel section 220 comprises a cylindrical section 224 and an elongated fin 226. The cylindrical section has a hollow bore 228. The bore 228 is shaped to receive the mounting rod 212. The second mandrel section 220 is removable and interchangeable with a traditional cylindrical mandrel component (not shown) which does not have a fin.

The mandrel adjusting block 76 is pinned to the mandrel mount bar 72 to allow for guided vertical movement therebetween, by two pins or posts 150, 152 (shown in FIG. 1). The adjusting block 76 is adjusted so that the mandrel 200 is aligned generally axially within the forming tube 48. The vertical position of the mandrel 200 can be adjusted as needed to correct any lopsidedness of the dough pieces.

The elongated fin 226 extends radially from the cylindrical section 224 and is disposed substantially along the length of the cylindrical section 224. The fin 226 can be longer than the cylindrical section 224, as illustrated in FIG. 3. Such a configuration is preferable so that the fin 226 extends from immediately adjacent to the mandrel support 60.

The fin 226 extends between the edges 26a, 26b of the belt and through the seam 104, providing a wall that extends from the mandrel 200 to the forming tube 48. The fin 226 is held firmly between the sections 48a and 48b. The fin 226 is preferably dimensioned so that the mandrel 200 can be vertically adjusted off an axial center of the forming tube 48 while the fin 226 can still extend through the seam 104. When an operator adjusts the mandrel 200, the clamps 82 must first be loosened to free the fin 226, then re-tightened after adjustment.

In an alternative embodiment of the present invention, the fin 226 is not attached to the Mandrel 200. In such an embodiment, the fin 226 is positioned against the sandal 200 and is secured in the seam 104 by tightening the clamps 82.

In a traditional bagel forming machine, which does not include the fin, as a dough piece is pulled by a belt through a forming tube, the dough piece rolls into a circular shape surrounding a cylindrical mandrel (not shown) sized for the desired diameter of a bagel hole with the free ends of the dough piece being pressed and rolled into each other so as to form a seamless annulus. In the present invention, as a dough piece is pulled by the belt 26 through the forming tube 48, the fin 226 prevents the dough from rolling into a circular shape. Rather, the fin 226 maintains a separation of free ends of the dough piece along the top of the mandrel 200. However, the dough is rolled between the cylindrical section 224 and the belt 26 into a shape of uniform thickness. When the belt 26 exits the forming tube 48 and flattens, the dough piece straightens out with the belt in the form of bagel stick because its ends have not been joined.

Figure 4:
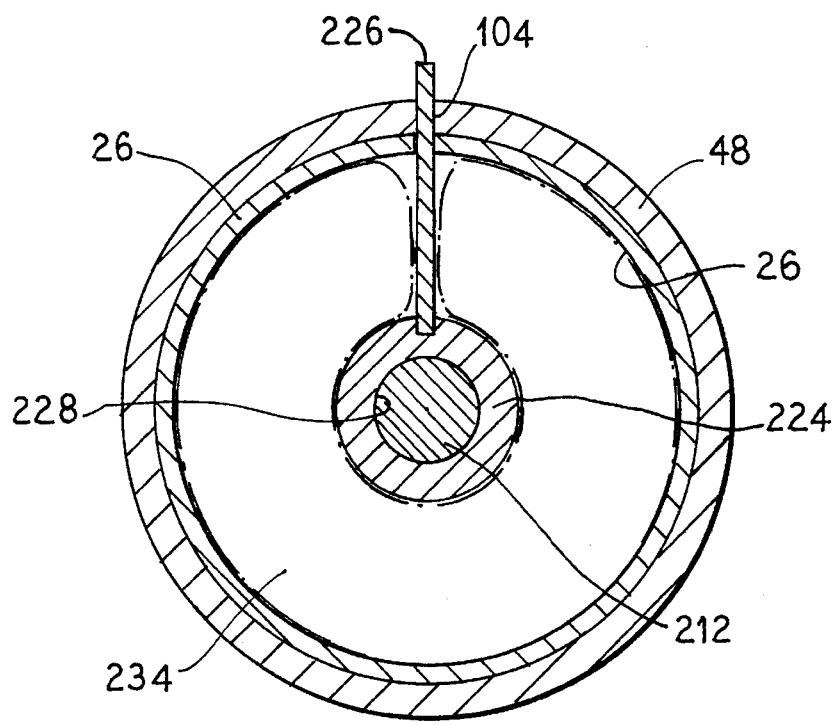
FIG. 4 is a sectional view taken generally along line IV—IV from FIG. 3.

Referring to FIG. 4, the fin 226 extends from the cylindrical section 224 to the forming tube 48. The belt edges 26a, 26b slide along each side of the fin 226, and are separated thereby. The fin 226 extends through the seam 104 of the forming tube 48 and is clamped therein using the clamp 82.

In FIG. 4, a dough piece 234 is illustrated being rolled between the belt 26 and the cylindrical section 224. The rolling action forms the dough piece 234 into a uniform shape. However, the fin 226 prevents the dough piece 234 from forming into a continuous circle around the mandrel 200.

Figure 5:
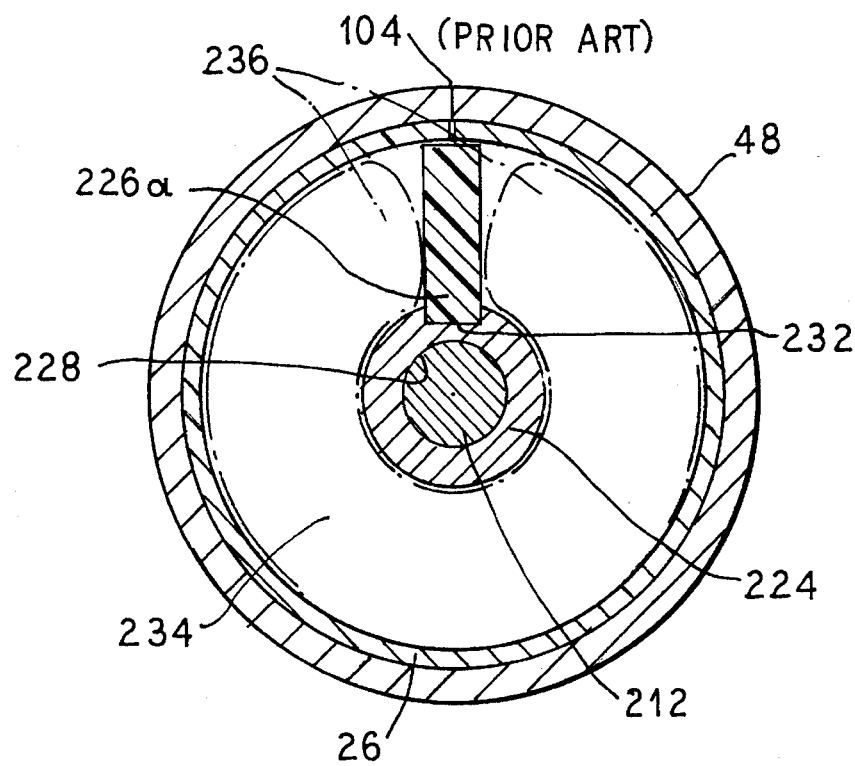
FIG. 5 is a sectional view of the prior art taken generally along line V—V from FIG. 3.

The present invention is an improvement over the prior art bagel stick modification shown in FIG. 5, in which the fin 226a fits in a slot 232 in the prior art mandrel section 224 and, extends only partially to the forming tube 48. In the prior art embodiment, the free ends 236 of the dough piece 234 bulge over the fin 226a. This bulging causes undesirable indentations in the dough which remain in the end of the dough piece 234. Furthermore, dough can stick to the top of the fin 226a and accumulate in a gap 230 between the fin 226a and the forming tube 48. The present invention, shown in FIG. 4, produces a more uniform and attractive bagel stick because the ends of the dough piece cannot bulge over the fin. Also, undesirable dough accumulation is reduced because there is no gap between the fin 226 and the forming tube 48.

The second mandrel section 220 is preferably interchangeable with a cylindrical mandrel (not shown) having no fin for forming traditional bagels.

Although the present invention has been described with reference to a specific embodiment, those of skill in the art will recognize that changes may be made thereto without departing from the scope and spirit of the invention as set forth in the appended claims. For example, a fin could be secured to the forming tube 48 or clamped within the seam 104 so that the mandrel 200 and fin are not integral to each other. Therefore, it is intended that such changes and modifications be covered by the appended claims.

I claim as my invention:

1. In a roll forming machine for shaping dough pieces wherein said machine has a flat circulating belt for carrying said dough pieces with a region of said belt wrapped into a circular cross section and drawn through a forming tube to surround an axially aligned mandrel such that said dough pieces are rolled around said mandrel, the improvement comprising:

a fin extending radially from said mandrel and contacting a wall of said forming tube.

2. The improvement according to claim 1 wherein said mandrel is adjustable radially.

3. The improvement according to claim 1 wherein said mandrel has a removable cylindrical section that has an axial hollow cavity shaped to receive a mounting rod.

4. The improvement according to claim 3 wherein said fin has a longer axial dimension than said removable cylindrical section.

5. The improvement according to claim 1, wherein said fin is secured to said mandrel.

6. The improvement according to claim 1, wherein said fin extends through a seam in said wall of said forming tube.

7. In a machine for forming rolled dough pieces, said machine having a flat belt circulating around two pulleys, said flat belt in a horizontal orientation on a top side thereof, said flat belt wrapped and drawn through a circular forming tube in a portion of said top side, said forming tube including a rigid tube wall, the improvement comprising:

a mandrel axially aligned and radially adjustable within said tube, said mandrel having an elongated cylindrical section and a fin extending outwardly therefrom substantially along the length of said cylindrical section so that the fin is positioned between wrapped-up edges of said belt and extends through said rigid wall of said tube.

8. The improvement according to claim 7 wherein said cylindrical section has an axial hollow cavity shaped to receive a mounting rod onto which said mandrel is secured.

9. The improvement according to claim 7 wherein said fin is secured to, but is longer than said cylindrical section.

10. The improvement according to claim 7, wherein said fin is secured to said mandrel.

11. A bagel stick forming machine comprising:

a drive wheel driven by a motor;

an idler wheel;

a belt extending between said drive wheel and said idler wheel;

a forming tube including a rigid tube wall with a seam therein positioned between said drive wheel and said idler wheel through which said belt passes, said forming tube causing lateral edges of said belt to curl upwardly forming a substantially circular cross section for said belt; and an elongated mandrel axially aligned and radially adjustable within said forming tube, said mandrel having an elongated cylindrical section and an elongated fin extending radially therefrom through said seam in the forming tube and between said curled-up lateral edges so that said curled-up lateral edges of said belt pass along sides of said fin.

12. The machine according to claim 11 wherein said cylindrical section has an axial hollow cavity shaped to receive a mounting rod.

13. The machine according to claim 11, wherein said fin is secured to said mandrel.

14. The machine according to claim 11, wherein said fin is secured to, said cylindrical section and has a dimension longer than said cylindrical section in an axial direction relative to said cylindrical section.

\* \* \* \* \*